US008331096B2

(12) United States Patent
Garcia

(10) Patent No.: US 8,331,096 B2
(45) Date of Patent: Dec. 11, 2012

(54) FINGERPRINT ACQUISITION EXPANSION CARD APPARATUS

(75) Inventor: Ed Garcia, San Jose, CA (US)

(73) Assignee: Validity Sensors, Inc., San Jose, CA (US)

( * ) Notice: Subject to any disclaimer, the term of this patent is extended or adjusted under 35 U.S.C. 154(b) by 165 days.

(21) Appl. No.: 12/860,748

(22) Filed: Aug. 20, 2010

(65) Prior Publication Data

US 2012/0044639 A1    Feb. 23, 2012

(51) Int. Cl.
*H05K 1/14* (2006.01)
(52) U.S. Cl. .................. 361/740; 361/801; 361/803
(58) Field of Classification Search .......... 361/728–730, 361/737, 740, 679.01, 600, 801–803
See application file for complete search history.

(56) References Cited

U.S. PATENT DOCUMENTS

| 4,151,512 | A | 4/1979 | Rigannati et al. |
| 4,225,850 | A | 9/1980 | Chang et al. |
| 4,310,827 | A | 1/1982 | Asai |
| 4,353,056 | A | 10/1982 | Tsikos |
| 4,525,859 | A | 6/1985 | Bowles et al. |
| 4,550,221 | A | 10/1985 | Mabusth |
| 4,580,790 | A | 4/1986 | Doose |
| 4,582,985 | A | 4/1986 | Loftberg |
| 4,758,622 | A | 7/1988 | Gosselin |
| 4,817,183 | A | 3/1989 | Sparrow |
| 5,076,566 | A | 12/1991 | Kriegel |
| 5,109,427 | A | 4/1992 | Yang |
| 5,140,642 | A | 8/1992 | Hau et al. |
| 5,305,017 | A | 4/1994 | Gerpheide |
| 5,319,323 | A | 6/1994 | Fong |
| 5,325,442 | A | 6/1994 | Knapp |
| 5,420,936 | A | 5/1995 | Fitzpatrick et al. |
| 5,422,807 | A | 6/1995 | Mitra et al. |
| 5,456,256 | A | 10/1995 | Schneider et al. |
| 5,543,591 | A | 8/1996 | Gillespie et al. |

(Continued)

FOREIGN PATENT DOCUMENTS

DE    2213813 A1    10/1973

(Continued)

OTHER PUBLICATIONS

Matsumoto et al., Impact of Artificial "Gummy" Fingers on Fingerprint Systems, SPIE 4677 (2002), reprinted from cryptome.org.

(Continued)

*Primary Examiner* — Hung S Bui
(74) *Attorney, Agent, or Firm* — Greenberg Traurig LLP; Cecily Anne O'Regan; William C. Cray

(57) ABSTRACT

An apparatus is described for a fingerprint acquisition device that can be integrated into an expansion card capable of being inserted into a PC card slot of a portable computer such that the apparatus is substantially flush with the computer. The apparatus can contain a drawer that rotates or slides out of the apparatus to expose a fingerprint module where a user's fingerprint data can be collected. A latching mechanism is provided so that the drawer can be locked in a retracted position in the apparatus when the drawer is pushed into the apparatus and so that the drawer can extract out of the apparatus if the user pushes on the drawer again when the drawer is in the retracted position.

8 Claims, 8 Drawing Sheets

U.S. PATENT DOCUMENTS

| | | | |
|---|---|---|---|
| 5,569,901 | A | 10/1996 | Bridgelall et al. |
| 5,623,552 | A | 4/1997 | Lane |
| 5,627,316 | A | 5/1997 | De Winter et al. |
| 5,650,842 | A | 7/1997 | Maase et al. |
| 5,717,777 | A | 2/1998 | Wong et al. |
| 5,781,651 | A | 7/1998 | Hsiao et al. |
| 5,801,681 | A | 9/1998 | Sayag |
| 5,818,956 | A | 10/1998 | Tuli |
| 5,838,306 | A | 11/1998 | O'Connor |
| 5,848,176 | A | 12/1998 | Harra et al. |
| 5,850,450 | A | 12/1998 | Schweitzer et al. |
| 5,852,670 | A | 12/1998 | Setlak et al. |
| 5,864,296 | A | 1/1999 | Upton |
| 5,887,343 | A | 3/1999 | Salatino et al. |
| 5,903,225 | A | 5/1999 | Schmitt et al. |
| 5,915,757 | A | 6/1999 | Tsuyama et al. |
| 5,920,384 | A | 7/1999 | Borza |
| 5,920,640 | A | 7/1999 | Salatino et al. |
| 5,940,526 | A | 8/1999 | Setlak et al. |
| 5,963,679 | A | 10/1999 | Setlak |
| 5,999,637 | A | 12/1999 | Toyoda et al. |
| 6,002,815 | A | 12/1999 | Immega et al. |
| 6,016,355 | A | 1/2000 | Dickinson et al. |
| 6,052,475 | A | 4/2000 | Upton |
| 6,067,368 | A | 5/2000 | Setlak et al. |
| 6,073,343 | A | 6/2000 | Petrick et al. |
| 6,076,566 | A | 6/2000 | Lowe |
| 6,088,585 | A | 7/2000 | Schmitt et al. |
| 6,098,175 | A | 8/2000 | Lee |
| 6,118,318 | A | 9/2000 | Fifield et al. |
| 6,134,340 | A | 10/2000 | Hsu et al. |
| 6,157,722 | A | 12/2000 | Lerner et al. |
| 6,161,213 | A | 12/2000 | Lofstrom |
| 6,175,407 | B1 | 1/2001 | Santor |
| 6,182,076 | B1 | 1/2001 | Yu et al. |
| 6,182,892 | B1 | 2/2001 | Angelo et al. |
| 6,185,318 | B1 | 2/2001 | Jain et al. |
| 6,234,031 | B1 | 5/2001 | Suga |
| 6,241,288 | B1 | 6/2001 | Bergenek et al. |
| 6,259,108 | B1 | 7/2001 | Antonelli et al. |
| 6,289,114 | B1 | 9/2001 | Mainguet |
| 6,292,272 | B1 * | 9/2001 | Okauchi et al. ............... 358/471 |
| 6,317,508 | B1 | 11/2001 | Kramer et al. |
| 6,320,394 | B1 | 11/2001 | Tartagni |
| 6,325,285 | B1 | 12/2001 | Baratelli |
| 6,332,193 | B1 | 12/2001 | Glass et al. |
| 6,333,989 | B1 | 12/2001 | Borza |
| 6,337,919 | B1 | 1/2002 | Duton |
| 6,346,739 | B1 | 2/2002 | Lepert et al. |
| 6,347,040 | B1 | 2/2002 | Fries et al. |
| 6,357,663 | B1 * | 3/2002 | Takahashi et al. ............ 235/486 |
| 6,360,004 | B1 | 3/2002 | Akizuki |
| 6,362,633 | B1 | 3/2002 | Tartagni |
| 6,392,636 | B1 | 5/2002 | Ferrari et al. |
| 6,399,994 | B2 | 6/2002 | Shobu |
| 6,400,836 | B2 | 6/2002 | Senior |
| 6,408,087 | B1 | 6/2002 | Kramer |
| 6,473,072 | B1 | 10/2002 | Comiskey et al. |
| 6,509,501 | B2 | 1/2003 | Eicken et al. |
| 6,525,547 | B2 | 2/2003 | Hayes |
| 6,525,932 | B1 * | 2/2003 | Ohnishi et al. ........... 361/679.41 |
| 6,539,101 | B1 | 3/2003 | Black |
| 6,580,816 | B2 | 6/2003 | Kramer et al. |
| 6,597,289 | B2 | 7/2003 | Sabatini |
| 6,628,812 | B1 | 9/2003 | Setlak et al. |
| 6,631,201 | B1 * | 10/2003 | Dickinson et al. ............ 382/124 |
| 6,643,389 | B1 | 11/2003 | Raynal et al. |
| 6,672,174 | B2 | 1/2004 | Deconde et al. |
| 6,710,416 | B1 | 3/2004 | Chou et al. |
| 6,738,050 | B2 | 5/2004 | Comiskey et al. |
| 6,741,729 | B2 | 5/2004 | Bjorn et al. |
| 6,757,002 | B1 | 6/2004 | Oross et al. |
| 6,766,040 | B1 | 7/2004 | Catalano et al. |
| 6,785,407 | B1 | 8/2004 | Tschudi et al. |
| 6,836,230 | B2 | 12/2004 | Le Pailleur et al. |
| 6,838,905 | B1 | 1/2005 | Doyle |
| 6,873,356 | B1 * | 3/2005 | Kanbe et al. ............... 348/207.1 |
| 6,886,104 | B1 | 4/2005 | McClurg et al. |
| 6,897,002 | B2 | 5/2005 | Teraoka et al. |
| 6,898,299 | B1 | 5/2005 | Brooks |
| 6,924,496 | B2 | 8/2005 | Manansala |
| 6,937,748 | B1 | 8/2005 | Schneider et al. |
| 6,941,001 | B1 | 9/2005 | Bolle et al. |
| 6,941,810 | B2 | 9/2005 | Okada |
| 6,950,540 | B2 | 9/2005 | Higuchi |
| 6,959,874 | B2 | 11/2005 | Bardwell |
| 6,963,626 | B1 | 11/2005 | Shaeffer et al. |
| 6,970,584 | B2 | 11/2005 | O'Gorman et al. |
| 6,980,672 | B2 | 12/2005 | Saito et al. |
| 6,983,882 | B2 | 1/2006 | Cassone |
| 7,013,030 | B2 | 3/2006 | Wong et al. |
| 7,020,591 | B1 | 3/2006 | Wei et al. |
| 7,030,860 | B1 | 4/2006 | Hsu et al. |
| 7,031,670 | B2 * | 4/2006 | May ............................ 455/90.3 |
| 7,035,443 | B2 | 4/2006 | Wong |
| 7,042,535 | B2 | 5/2006 | Katoh et al. |
| 7,043,061 | B2 | 5/2006 | Hamid et al. |
| 7,043,644 | B2 | 5/2006 | DeBruine |
| 7,046,230 | B2 | 5/2006 | Zadesky et al. |
| 7,064,743 | B2 | 6/2006 | Nishikawa |
| 7,099,496 | B2 | 8/2006 | Benkley |
| 7,110,574 | B2 * | 9/2006 | Haruki et al. .................. 382/115 |
| 7,110,577 | B1 | 9/2006 | Tschud |
| 7,113,622 | B2 | 9/2006 | Hamid |
| 7,126,389 | B1 | 10/2006 | McRae et al. |
| 7,129,926 | B2 | 10/2006 | Mathiassen et al. |
| 7,136,514 | B1 | 11/2006 | Wong |
| 7,146,024 | B2 | 12/2006 | Benkley |
| 7,146,026 | B2 | 12/2006 | Russon et al. |
| 7,146,029 | B2 | 12/2006 | Manansala |
| 7,184,581 | B2 | 2/2007 | Johansen et al. |
| 7,190,816 | B2 | 3/2007 | Mitsuyu et al. |
| 7,194,392 | B2 | 3/2007 | Tuken et al. |
| 7,197,168 | B2 | 3/2007 | Russo |
| 7,200,250 | B2 | 4/2007 | Chou |
| 7,251,351 | B2 | 7/2007 | Mathiassen et al. |
| 7,258,279 | B2 | 8/2007 | Schneider et al. |
| 7,260,246 | B2 | 8/2007 | Fujii |
| 7,263,212 | B2 | 8/2007 | Kawabe |
| 7,263,213 | B2 | 8/2007 | Rowe |
| 7,289,649 | B1 | 10/2007 | Walley et al. |
| 7,290,323 | B2 | 11/2007 | Deconde et al. |
| 7,308,121 | B2 | 12/2007 | Mathiassen et al. |
| 7,308,122 | B2 | 12/2007 | McClurg et al. |
| 7,321,672 | B2 | 1/2008 | Sasaki et al. |
| 7,356,169 | B2 | 4/2008 | Hamid |
| 7,360,688 | B1 | 4/2008 | Harris |
| 7,369,685 | B2 | 5/2008 | DeLeon |
| 7,379,569 | B2 | 5/2008 | Chikazawa et al. |
| 7,408,135 | B2 * | 8/2008 | Fujieda ....................... 250/208.1 |
| 7,409,876 | B2 | 8/2008 | Ganapathi et al. |
| 7,412,083 | B2 | 8/2008 | Takahashi |
| 7,424,618 | B2 | 9/2008 | Roy et al. |
| 7,447,339 | B2 | 11/2008 | Mimura et al. |
| 7,447,911 | B2 | 11/2008 | Chou et al. |
| 7,460,697 | B2 | 12/2008 | Erhart et al. |
| 7,463,756 | B2 | 12/2008 | Benkley |
| 7,505,611 | B2 | 3/2009 | Fyke |
| 7,505,613 | B2 | 3/2009 | Russo |
| 7,565,548 | B2 | 7/2009 | Fiske et al. |
| 7,574,022 | B2 | 8/2009 | Russo |
| 7,596,832 | B2 * | 10/2009 | Hsieh et al. ....................... 16/342 |
| 7,643,950 | B1 | 1/2010 | Getzin et al. |
| 7,646,897 | B2 | 1/2010 | Fyke |
| 7,681,232 | B2 | 3/2010 | Nordentoft et al. |
| 7,689,013 | B2 | 3/2010 | Shinzaki |
| 7,706,581 | B2 | 4/2010 | Drews et al. |
| 7,733,697 | B2 | 6/2010 | Picca et al. |
| 7,751,601 | B2 | 7/2010 | Benkley |
| 7,843,438 | B2 | 11/2010 | Onoda |
| 7,848,798 | B2 | 12/2010 | Martinsen et al. |
| 7,899,216 | B2 | 3/2011 | Watanabe et al. |
| 7,953,258 | B2 | 5/2011 | Dean et al. |
| 8,005,276 | B2 | 8/2011 | Dean et al. |
| 8,031,916 | B2 | 10/2011 | Abiko et al. |
| 8,077,935 | B2 | 12/2011 | Geoffroy et al. |
| 8,107,212 | B2 | 1/2012 | Nelson et al. |

| | | |
|---|---|---|
| 8,116,540 B2 | 2/2012 | Dean et al. |
| 8,131,026 B2 | 3/2012 | Benkley et al. |
| 8,165,355 B2 | 4/2012 | Benkley et al. |
| 8,175,345 B2 | 5/2012 | Gardner |
| 8,204,281 B2 | 6/2012 | Satya et al. |
| 8,224,044 B2 | 7/2012 | Benkley |
| 8,229,184 B2 | 7/2012 | Benkley |
| 2001/0026636 A1 | 10/2001 | Mainget |
| 2001/0030644 A1 | 10/2001 | Allport |
| 2001/0036299 A1 | 11/2001 | Senior |
| 2001/0043728 A1 | 11/2001 | Kramer et al. |
| 2002/0025062 A1 | 2/2002 | Black |
| 2002/0061125 A1 | 5/2002 | Fujii |
| 2002/0064892 A1 | 5/2002 | Lepert et al. |
| 2002/0067845 A1 | 6/2002 | Griffis |
| 2002/0073046 A1 | 6/2002 | David |
| 2002/0089044 A1 | 7/2002 | Simmons et al. |
| 2002/0089410 A1 | 7/2002 | Janiak et al. |
| 2002/0096731 A1 | 7/2002 | Wu et al. |
| 2002/0122026 A1 | 9/2002 | Bergstrom |
| 2002/0126516 A1 | 9/2002 | Jeon |
| 2002/0133725 A1 | 9/2002 | Roy et al. |
| 2002/0152048 A1 | 10/2002 | Hayes |
| 2002/0181749 A1 | 12/2002 | Matsumoto et al. |
| 2003/0002717 A1 | 1/2003 | Hamid |
| 2003/0002719 A1 | 1/2003 | Hamid et al. |
| 2003/0021495 A1 | 1/2003 | Cheng |
| 2003/0035570 A1 | 2/2003 | Benkley |
| 2003/0063782 A1 | 4/2003 | Acharya et al. |
| 2003/0068072 A1 | 4/2003 | Hamid |
| 2003/0076301 A1 | 4/2003 | Tsuk et al. |
| 2003/0076303 A1 | 4/2003 | Huppi |
| 2003/0095096 A1 | 5/2003 | Robbin et al. |
| 2003/0095690 A1 | 5/2003 | Su et al. |
| 2003/0102874 A1 | 6/2003 | Lane et al. |
| 2003/0123714 A1 | 7/2003 | O'Gorman et al. |
| 2003/0123715 A1 | 7/2003 | Uchida |
| 2003/0141959 A1 | 7/2003 | Keogh et al. |
| 2003/0147015 A1 | 8/2003 | Katoh et al. |
| 2003/0161510 A1 | 8/2003 | Fuji |
| 2003/0161512 A1 | 8/2003 | Mathiassen et al. |
| 2003/0169228 A1 | 9/2003 | Mathiassen et al. |
| 2003/0174871 A1 | 9/2003 | Yoshioka et al. |
| 2003/0186157 A1 | 10/2003 | Teraoka et al. |
| 2003/0209293 A1 | 11/2003 | Sako et al. |
| 2003/0224553 A1 | 12/2003 | Manansala |
| 2004/0012773 A1 | 1/2004 | Puttkammer |
| 2004/0017934 A1 | 1/2004 | Kocher et al. |
| 2004/0022001 A1 | 2/2004 | Chu et al. |
| 2004/0042642 A1 | 3/2004 | Bolle et al. |
| 2004/0050930 A1 | 3/2004 | Rowe |
| 2004/0066613 A1 | 4/2004 | Leitao |
| 2004/0076313 A1 | 4/2004 | Bronstein et al. |
| 2004/0081339 A1 | 4/2004 | Benkley |
| 2004/0096086 A1 | 5/2004 | Miyasaka |
| 2004/0113956 A1 | 6/2004 | Bellwood et al. |
| 2004/0120400 A1 | 6/2004 | Linzer |
| 2004/0125993 A1 | 7/2004 | Zhao et al. |
| 2004/0129787 A1 | 7/2004 | Saito |
| 2004/0136612 A1 | 7/2004 | Meister et al. |
| 2004/0155752 A1 | 8/2004 | Radke |
| 2004/0172339 A1 | 9/2004 | Snelgrove et al. |
| 2004/0179718 A1 | 9/2004 | Chou |
| 2004/0184641 A1 | 9/2004 | Nagasaka et al. |
| 2004/0190761 A1 | 9/2004 | Lee |
| 2004/0208346 A1 | 10/2004 | Baharav et al. |
| 2004/0208347 A1 | 10/2004 | Baharav et al. |
| 2004/0208348 A1 | 10/2004 | Baharav et al. |
| 2004/0213441 A1 | 10/2004 | Tschudi |
| 2004/0215689 A1 | 10/2004 | Dooley et al. |
| 2004/0228505 A1 | 11/2004 | Sugimoto |
| 2004/0228508 A1 | 11/2004 | Shigeta |
| 2004/0240712 A1 | 12/2004 | Rowe et al. |
| 2004/0252867 A1 | 12/2004 | Lan et al. |
| 2005/0031174 A1 | 2/2005 | Ryhanen et al. |
| 2005/0036665 A1 | 2/2005 | Higuchi |
| 2005/0047485 A1 | 3/2005 | Khayrallah et al. |
| 2005/0100196 A1 | 5/2005 | Scott et al. |
| 2005/0100938 A1 | 5/2005 | Hoffmann et al. |
| 2005/0109835 A1 | 5/2005 | Jacoby et al. |
| 2005/0110103 A1 | 5/2005 | Setlak |
| 2005/0111708 A1 | 5/2005 | Chou |
| 2005/0123176 A1 | 6/2005 | Ishil et al. |
| 2005/0129291 A1 | 6/2005 | Boshra |
| 2005/0136200 A1 | 6/2005 | Durell et al. |
| 2005/0139656 A1 | 6/2005 | Arnouse |
| 2005/0139685 A1 | 6/2005 | Kozlay |
| 2005/0162402 A1 | 7/2005 | Watanachote |
| 2005/0169503 A1 | 8/2005 | Howell et al. |
| 2005/0174015 A1 | 8/2005 | Scott et al. |
| 2005/0210271 A1 | 9/2005 | Chou et al. |
| 2005/0219200 A1 | 10/2005 | Weng |
| 2005/0220329 A1 | 10/2005 | Payne et al. |
| 2005/0231213 A1 | 10/2005 | Chou et al. |
| 2005/0238212 A1 | 10/2005 | Du et al. |
| 2005/0244038 A1 | 11/2005 | Benkley |
| 2005/0244039 A1 | 11/2005 | Geoffroy et al. |
| 2005/0247559 A1 | 11/2005 | Frey et al. |
| 2005/0249386 A1 | 11/2005 | Juh |
| 2005/0258952 A1 | 11/2005 | Utter et al. |
| 2005/0269402 A1 | 12/2005 | Spitzer et al. |
| 2006/0006224 A1 | 1/2006 | Modi |
| 2006/0055500 A1 | 3/2006 | Burke et al. |
| 2006/0066572 A1 | 3/2006 | Yumoto et al. |
| 2006/0078176 A1 | 4/2006 | Abiko et al. |
| 2006/0083411 A1 | 4/2006 | Benkley |
| 2006/0110537 A1 | 5/2006 | Huang et al. |
| 2006/0140461 A1 | 6/2006 | Kim et al. |
| 2006/0144953 A1 | 7/2006 | Takao |
| 2006/0170528 A1 | 8/2006 | Funushige et al. |
| 2006/0187200 A1 | 8/2006 | Martin |
| 2006/0210082 A1 | 9/2006 | Devadas et al. |
| 2006/0214512 A1 | 9/2006 | Iwata |
| 2006/0239514 A1 | 10/2006 | Watanabe et al. |
| 2006/0249008 A1 | 11/2006 | Luther |
| 2006/0259873 A1 | 11/2006 | Mister |
| 2006/0261174 A1 | 11/2006 | Zellner et al. |
| 2006/0267385 A1 | 11/2006 | Steenwyk et al. |
| 2006/0271793 A1 | 11/2006 | Devadas et al. |
| 2006/0287963 A1 | 12/2006 | Steeves et al. |
| 2007/0031011 A1 | 2/2007 | Erhart et al. |
| 2007/0036400 A1 | 2/2007 | Watanabe et al. |
| 2007/0057763 A1 | 3/2007 | Blattner et al. |
| 2007/0067828 A1 | 3/2007 | Bychkov |
| 2007/0076926 A1 | 4/2007 | Schneider et al. |
| 2007/0076951 A1 | 4/2007 | Tanaka et al. |
| 2007/0086634 A1 | 4/2007 | Setlak et al. |
| 2007/0090312 A1 | 4/2007 | Stallinga et al. |
| 2007/0138299 A1 | 6/2007 | Mitra |
| 2007/0160269 A1 | 7/2007 | Kuo |
| 2007/0180261 A1 | 8/2007 | Akkermans et al. |
| 2007/0196002 A1 | 8/2007 | Choi et al. |
| 2007/0198141 A1 | 8/2007 | Moore |
| 2007/0198435 A1 | 8/2007 | Siegal et al. |
| 2007/0228154 A1 | 10/2007 | Tran |
| 2007/0237366 A1 | 10/2007 | Maletsky |
| 2007/0248249 A1 | 10/2007 | Stoianov |
| 2008/0002867 A1 | 1/2008 | Mathiassen et al. |
| 2008/0013805 A1 | 1/2008 | Sengupta et al. |
| 2008/0019578 A1 | 1/2008 | Saito et al. |
| 2008/0049987 A1 | 2/2008 | Champagne et al. |
| 2008/0049989 A1 | 2/2008 | Iseri et al. |
| 2008/0063245 A1 | 3/2008 | Benkley et al. |
| 2008/0069412 A1 | 3/2008 | Champagne et al. |
| 2008/0126260 A1 | 5/2008 | Cox et al. |
| 2008/0169345 A1 | 7/2008 | Keane et al. |
| 2008/0170695 A1 | 7/2008 | Adler et al. |
| 2008/0175450 A1 | 7/2008 | Scott et al. |
| 2008/0178008 A1 | 7/2008 | Takahashi et al. |
| 2008/0179112 A1 | 7/2008 | Qin et al. |
| 2008/0185429 A1 | 8/2008 | Saville |
| 2008/0201265 A1 | 8/2008 | Hewton |
| 2008/0205714 A1 | 8/2008 | Benkley et al. |
| 2008/0219521 A1 | 9/2008 | Benkley et al. |
| 2008/0222049 A1 | 9/2008 | Loomis et al. |
| 2008/0223925 A1 | 9/2008 | Saito et al. |
| 2008/0226132 A1 | 9/2008 | Gardner |
| 2008/0240523 A1 | 10/2008 | Benkley et al. |

| | | | |
|---|---|---|---|
| 2008/0244277 A1 | 10/2008 | Orsini et al. | |
| 2008/0267462 A1 | 10/2008 | Nelson et al. | |
| 2008/0279373 A1 | 11/2008 | Erhart et al. | |
| 2008/0317290 A1 | 12/2008 | Tazoe | |
| 2009/0130369 A1 | 5/2009 | Huang et al. | |
| 2009/0153297 A1 | 6/2009 | Gardner | |
| 2009/0154779 A1 | 6/2009 | Satyan et al. | |
| 2009/0155456 A1 | 6/2009 | Benkley et al. | |
| 2009/0169071 A1 | 7/2009 | Bond et al. | |
| 2009/0174974 A1 | 7/2009 | Huang et al. | |
| 2009/0237135 A1 | 9/2009 | Ramaraju et al. | |
| 2009/0252384 A1 | 10/2009 | Dean et al. | |
| 2009/0252385 A1 | 10/2009 | Dean et al. | |
| 2009/0252386 A1 | 10/2009 | Dean et al. | |
| 2009/0279742 A1 | 11/2009 | Abiko | |
| 2009/0319435 A1 | 12/2009 | Little et al. | |
| 2009/0324028 A1 | 12/2009 | Russo | |
| 2010/0026451 A1 | 2/2010 | Erhart et al. | |
| 2010/0045705 A1 | 2/2010 | Vertegaal et al. | |
| 2010/0083000 A1 | 4/2010 | Kesanupalli et al. | |
| 2010/0119124 A1 | 5/2010 | Satyan | |
| 2010/0123675 A1 | 5/2010 | Ippel | |
| 2010/0127366 A1 | 5/2010 | Bond et al. | |
| 2010/0176823 A1 | 7/2010 | Thompson et al. | |
| 2010/0176892 A1 | 7/2010 | Thompson et al. | |
| 2010/0177940 A1 | 7/2010 | Thompson et al. | |
| 2010/0180136 A1 | 7/2010 | Thompson et al. | |
| 2010/0189314 A1 | 7/2010 | Benkley et al. | |
| 2010/0208953 A1 | 8/2010 | Gardner et al. | |
| 2010/0244166 A1 | 9/2010 | Shibuta et al. | |
| 2010/0272329 A1 | 10/2010 | Benkley | |
| 2010/0284565 A1 | 11/2010 | Benkley et al. | |
| 2011/0002461 A1 | 1/2011 | Erhart et al. | |
| 2011/0018556 A1 | 1/2011 | Le et al. | |
| 2011/0090047 A1 | 4/2011 | Patel | |
| 2011/0102567 A1 | 5/2011 | Erhart | |
| 2011/0102569 A1 | 5/2011 | Erhart | |
| 2011/0175703 A1 | 7/2011 | Benkley | |
| 2011/0176037 A1 | 7/2011 | Benkley | |
| 2011/0182486 A1 | 7/2011 | Valfridsson et al. | |
| 2011/0214924 A1 | 9/2011 | Perezselsky et al. | |
| 2011/0267298 A1 | 11/2011 | Erhart et al. | |
| 2011/0298711 A1 | 12/2011 | Dean et al. | |
| 2011/0304001 A1 | 12/2011 | Erhart et al. | |

FOREIGN PATENT DOCUMENTS

| | | |
|---|---|---|
| EP | 0929028 A2 | 1/1998 |
| EP | 0905646 A1 | 3/1999 |
| EP | 0973123 A1 | 1/2000 |
| EP | 1018697 A2 | 7/2000 |
| EP | 1139301 A2 | 10/2001 |
| EP | 1531419 A2 | 5/2005 |
| EP | 1533759 A1 | 5/2005 |
| EP | 1538548 A2 | 6/2005 |
| EP | 1624399 B1 | 2/2006 |
| EP | 1775674 A1 | 4/2007 |
| EP | 1939788 A1 | 7/2008 |
| GB | 2331613 A | 5/1999 |
| GB | 2480919 | 12/2011 |
| JP | 01094418 A2 | 4/1989 |
| JP | 04158434 A2 | 6/1992 |
| JP | 2005011002 A | 1/2005 |
| JP | 2005242856 | 9/2005 |
| JP | 2007305097 A | 11/2007 |
| TW | 200606745 A | 2/2006 |
| TW | 200620140 A | 6/2006 |
| TW | 200629167 A | 8/2006 |
| WO | WO 90/03620 A1 | 4/1990 |
| WO | WO 98/58342 A1 | 12/1998 |
| WO | WO 99/28701 A1 | 6/1999 |
| WO | WO 99/43258 A1 | 9/1999 |
| WO | WO 01/22349 A1 | 3/2001 |
| WO | WO 01/94902 A2 | 12/2001 |
| WO | WO 01/94902 A3 | 12/2001 |
| WO | WO 01/95304 A1 | 12/2001 |
| WO | WO 02/11066 A1 | 2/2002 |
| WO | WO 02/47018 A2 | 6/2002 |
| WO | WO 02/47018 A3 | 6/2002 |
| WO | WO 02/061668 A1 | 8/2002 |
| WO | WO 02/077907 A1 | 10/2002 |
| WO | WO 03/063054 A2 | 7/2003 |
| WO | WO 03/075210 A2 | 9/2003 |
| WO | WO 2004/066194 A1 | 8/2004 |
| WO | WO 2004/066693 A1 | 8/2004 |
| WO | WO 2005/104012 A1 | 11/2005 |
| WO | WO 2005/106774 A2 | 11/2005 |
| WO | WO 2005/106774 A3 | 11/2005 |
| WO | WO 2006/040724 | 4/2006 |
| WO | WO 2006/041780 A1 | 4/2006 |
| WO | WO 2007/011607 A1 | 1/2007 |
| WO | WO 2008/033264 A2 | 3/2008 |
| WO | WO 2008/033264 A3 | 3/2008 |
| WO | WO 2008/033265 A2 | 6/2008 |
| WO | WO 2008/033265 A3 | 6/2008 |
| WO | WO 2008/137287 A1 | 11/2008 |
| WO | WO 2009/002599 A2 | 12/2008 |
| WO | WO 2009/002599 A3 | 12/2008 |
| WO | WO 2009/029257 A1 | 6/2009 |
| WO | WO 2009/079219 A1 | 6/2009 |
| WO | WO 2009/079221 A2 | 6/2009 |
| WO | WO 2009/079257 A1 | 6/2009 |
| WO | WO 2009/079262 A1 | 6/2009 |
| WO | WO 2010/034036 A1 | 3/2010 |
| WO | WO 2010/036445 A1 | 4/2010 |
| WO | WO 2011/088248 A1 | 1/2011 |
| WO | WO/2011/088252 A1 | 1/2011 |
| WO | WO 2011/053797 | 5/2011 |

OTHER PUBLICATIONS

Maltoni, "Handbook of Fingerprint Recognition", XP002355942 Springer, New York, USA, Jun. 2003 pp. 65-69.

Vermasan, et al., "A 500 dpi AC Capacitive Hybrid Flip-Chip CMOS ASIC/Sensor Module for Fingerprint, Navigation, and Pointer Detection With On-Chip Data Processing", IEEE Journal of Solid State Circuits, vol. 38, No. 12, Dec. 2003, pp. 2288-2294.

Ratha, et al. "Adaptive Flow Orientation Based Feature Extraction in Fingerprint Images," Pattern Recognition, vol. 28 No. 11, 1657-1672, Nov. 1995.

Ratha, et al., "A Real Time Matching System for Large Fingerprint Databases," IEEE, Aug. 1996.

Suh, et al., "Design and Implementation of the AEGIS Single-Chip Secure Processor Using Physical Random Functions", Computer Architecture, 2005, ISCA '05, Proceedings, 32nd International Symposium, Jun. 2005 (MIT Technical Report CSAIL CSG-TR-843, 2004.

Rivest, et al., "A Method for Obtaining Digital Signatures and Public-Key Cryptosystems", Communication of the ACM, vol. 21 (2), pp. 120-126. (1978).

Hiltgen, et al., "Secure Internet Banking Authentication", IEEE Security and Privacy, IEEE Computer Society, New York, NY, US, Mar. 1, 2006, pp. 24-31, XP007908655, ISSN: 1540-7993.

Hegt, "Analysis of Current and Future Phishing Attacks on Internet Banking Services", Mater Thesis. Techische Universiteit Eindhoven—Department of Mathematics and Computer Science May 31, 2008, pp. 1-149, XP002630374, Retrieved from the Internet: URL:http://alexandria.tue.nl/extral/afstversl/wsk-i/hgt2008.pdf [retrieved on Mar. 29, 2011] *pp. 127-134, paragraph 6.2*.

Gassend, et al., "Controlled Physical Random Functions", In Proceedings of the 18th Annual Computer Security Conference, Las Vegas, Nevada, Dec. 12, 2002.

BELLAGIODESIGNS.COM (Inernet Archive Wayback Machine, www.bellagiodesigns.com date: Oct. 29, 2005).

Wikipedia (Mar. 2003). "Integrated Circuit," http://en.wikipedia.org/wiki/integrated_circuit. Revision as of Mar. 23, 2003.

Wikipedia (Dec. 2006). "Integrated circuit" Revision as of Dec. 10, 2006. http://en.widipedia.org/wiki/Integrated_circuit.

Closed Loop Systems, The Free Dictionary, http://www.thefreedictionary.com/closed-loop+system (downloaded Dec. 1, 2011).

Feedback: Electronic Engineering, Wikipedia, p. 5 http://en.wikipedia.org/wiki/Feedback#Electronic_engineering (downloaded Dec. 1, 2011).

Galy et al. (Jul. 2007) "A full fingerprint verification system for a single-line sweep sensor." IEEE Sensors J., vol. 7 No. 7, pp. 1054-1065.

* cited by examiner

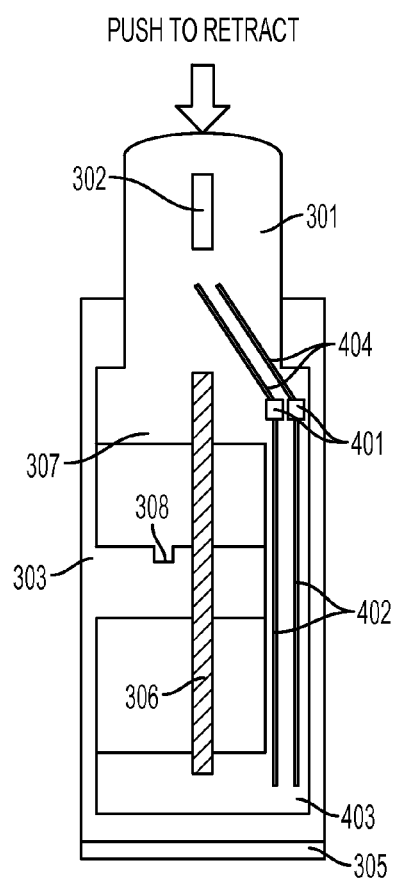
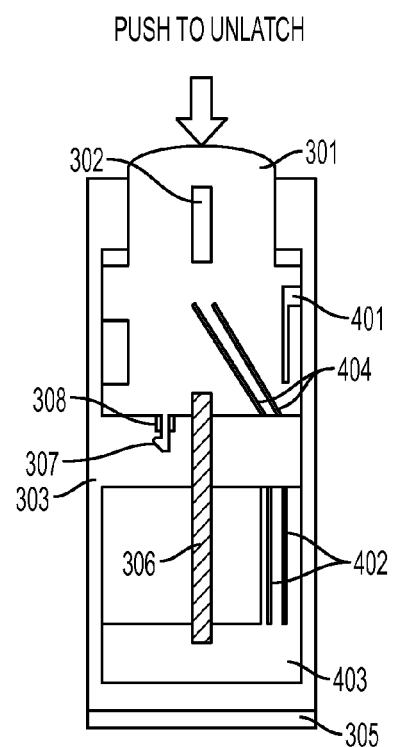
FIG. 4A
FIG. 4B

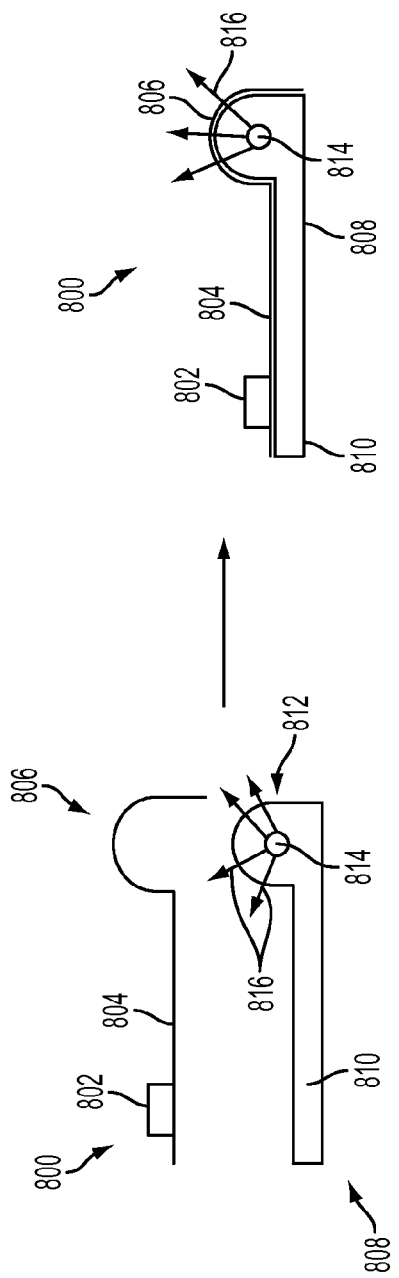

FINGERPRINT ACQUISITION EXPANSION CARD APPARATUS

FIELD OF THE INVENTION

The present invention relates generally to the field of fingerprint acquisition devices and more particularly to fingerprint acquisition devices integrated into expansion cards.

BACKGROUND

As the use of computers in virtually any type of transaction has increased, the issues of security have gained significant importance. Fingerprint acquisition devices allow for convenient and highly secure access control in computers. Such devices identify a user by his or her fingerprint after the user slides a finger or otherwise inputs a fingerprint into the device, providing a convenient and highly secure means to restrict user access to a computer or an application.

A problem with fingerprint acquisition devices is large size because of surface area required by a sensor. Generally, fingerprint acquisition devices are external units that connect to one of a computer's device interfaces. Particularly in the case of portable computers, an external fingerprint acquisition device poses significant inconvenience to users.

However, virtually all modern portable computers incorporate slots for expansion cards, otherwise known as PC cards or more specifically as PCMCIA cards, which are standard size and implement standard connections. PC card slots permit a user to insert a device into a laptop, such as a memory card, so that the device is contained substantially fully within the laptop. What is needed is a fingerprint acquisition device that can be implemented within an expansion card slot so that it does not create inconvenience to users by consuming space outside of the computer.

BRIEF DESCRIPTION OF THE DRAWINGS

Similar reference numbers are used throughout the figures to reference like components and/or features.

FIG. 4A illustrates an example of a fingerprint acquisition device in an extracted position with a contact for connecting the drawer to the connector, in accordance with various embodiments.

FIG. 4B illustrates an example of a fingerprint acquisition device in a retracted position with a contact for connecting the drawer to the connector, in accordance with various embodiments.

FIG. 8A depicts an example assembly of an illuminated fingerprint sensor 800.

FIG. 8B depicts illuminated fingerprint sensor 800 after sensor portion 806 has been mated to illumination portion 808.

FIG. 8C depicts illuminated fingerprint sensor 800 mounted in a housing 822 or other mounting mechanism.

DETAILED DESCRIPTION

In the following description, numerous specific details are set forth in order to provide a thorough understanding of the present invention. However, it will be apparent to one skilled in the art that the present invention can be practiced without these specific details. In other instances, well known circuits, electrical components, mechanical components, algorithms, and processes have not been shown in detail or have been illustrated in schematic or block diagram form in order not to obscure the present invention in unnecessary detail. Additionally, for the most part, details concerning fingerprint recognition systems, expansion cards, fingerprint sensors, personal computers, springs, latches, fingerprint sensors, and the like have been omitted inasmuch as such details are not considered necessary to obtain a complete understanding of the present invention and are considered to be within the understanding of persons of ordinary skill in the relevant art. Certain terms are used throughout the following description and Claims to refer to particular system components. As one skilled in the art will appreciate, components may be referred to by different names. This document does not intend to distinguish between components that differ in name, but not function. In the following discussion and in the Claims, the terms "including" and "comprising" are used in an open-ended fashion, and thus should be interpreted to mean "including, but not limited to . . . ."

Embodiments of the present invention are described herein. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with applications and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
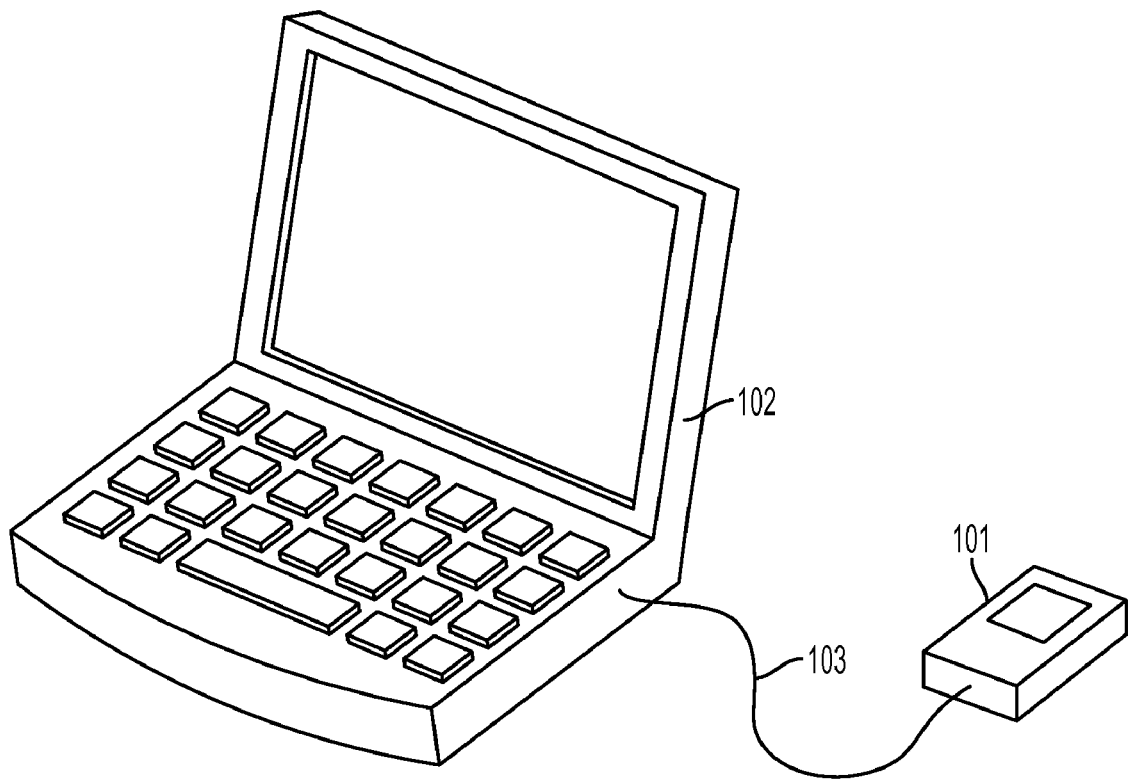
FIG. 1 illustrates a portable computer with an external fingerprint acquisition device in existing prior art.

FIG. 1 illustrates a portable computer with an external fingerprint acquisition device in existing prior art. A fingerprint acquisition device 101 can be connected to a portable computer 102 by a cable 103. A user can swipe his or her finger on the fingerprint acquisition device 101, which can collect fingerprint information, and the fingerprint information can be conveyed to the computer 102 through the cable 103 for validation. Such devices can be inconvenient because they consume desktop space, involve an awkward cable, and are clumsy to transport.

Figure 2A:
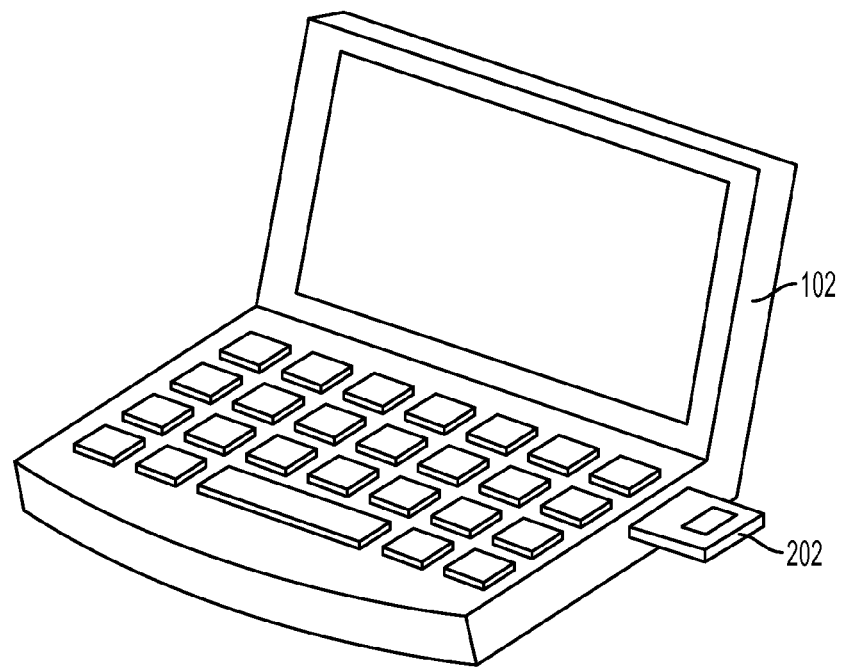
FIG. 2A illustrates an example of a portable computer with a fingerprint acquisition device in the extracted position, in accordance with various embodiments of the invention.

FIG. 2A illustrates an example of a portable computer with a fingerprint acquisition device in the extracted position, in accordance with various embodiments of the invention. A drawer 202 within the fingerprint acquisition device can extract from a portable computer 102 and the user can swipe his or her finger on the fingerprint acquisition device.

Figure 2B:
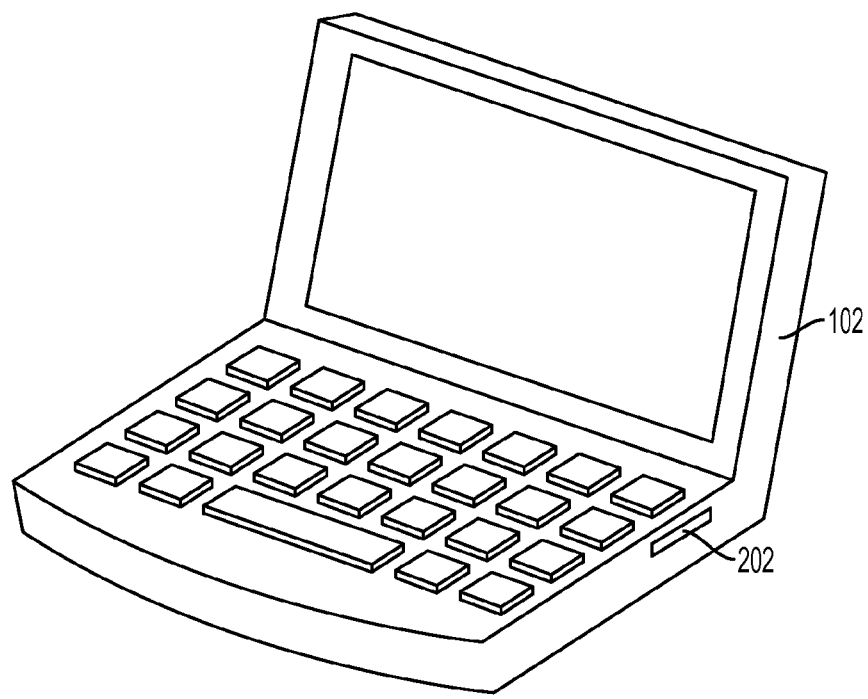
FIG. 2B illustrates an example of a portable computer with a fingerprint acquisition device in the retracted position, in accordance with various embodiments of the invention.

FIG. 2B illustrates an example of a portable computer with a fingerprint acquisition device in the retracted position, in accordance with various embodiments of the invention. As illustrated in the figure, when the fingerprint acquisition device is not in use, the user can push the drawer 202 into the laptop so that the drawer 202 is locked in a position flush with the laptop and does not consume space outsider of the computer. If the user wishes to again use the fingerprint acquisition device, the user can push on the drawer 202, which can unlock it from the laptop and allow it to slide back out into the extracted position as illustrated in FIG. 2A.

Figure 3A:
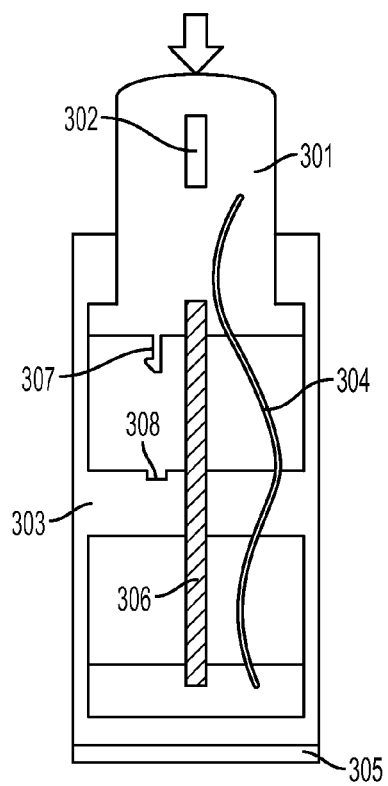
FIG. 3A illustrates a top view of an example of the fingerprint acquisition device with a sliding drawer in the extracted position.

FIG. 3A illustrates a top view of an example of the fingerprint acquisition device with a sliding drawer in the extracted position. A drawer 301 containing a fingerprint module 302 can slide within a chassis 303. The chassis can be located substantially within an expansion card slot of a user device such as a laptop computer, such that when the drawer is in the extracted position, as illustrated, the drawer 301 extends outside of the user device and allows a user access to the fingerprint module 302. The user can input a reading of his or her fingerprint into the fingerprint module 302 for recognition by the system, such as by swiping his or her finger on the fingerprint module 302. The fingerprint module 302 can be connected by a wire 304, such as a USB wire, to an express card connector 305, which connector 305 can be configured to interface with the user device. A spring 306 can apply force on the drawer 301 to keep the drawer in the extracted position. A user can push on the drawer 301 as illustrated to compress the spring 306 and slide the drawer 301 into the chassis 303. A latch 307 can be located on the drawer 301 and a corresponding catch 308 can be located on the chassis 303. The latch 307 and catch 308 can be configured so that the latch 307 becomes locked into the catch 308 when the latch 307 is pushed into the catch 308. Hence, when the drawer reaches a retracted position, the latch 307 can lock into the catch 308, thereby locking the drawer in a retracted position.

Figure 3B:
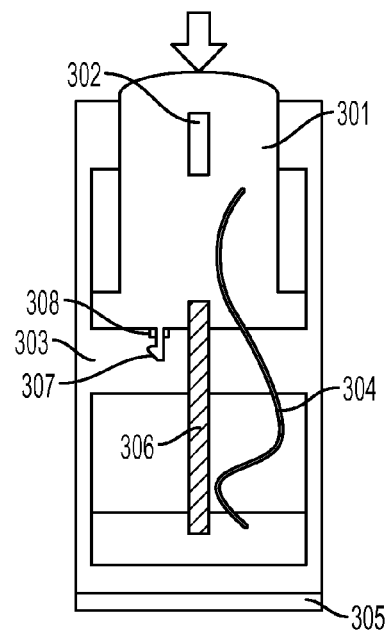
FIG. 3B illustrates a top view of an example of the fingerprint acquisition device with a sliding drawer in the retracted position, in accordance with various embodiments.

FIG. 3B illustrates a top view of an example of the fingerprint acquisition device with a sliding drawer in the retracted position, in accordance with various embodiments. As illustrated in the example, the spring 306 can be in a compressed state applying force on the drawer 301 pushing the drawer 301 out while the latch 307 can be locked into the catch 308, preventing the drawer 301 from sliding out of the chassis 303. The latch 307 and the catch 308 can be configured such that when the latch 307 is pushed into the catch 308, the latch 307 becomes unlocked from the catch 308. Hence, by pushing on the drawer 301, as illustrated, the latch 307 can become unlatched from the catch 308 and the drawer 301 can slide out of the chassis 303 under the force of the spring 306, revealing the fingerprint module 302 to the user.

FIG. 4A illustrates an example of a fingerprint acquisition device in an extracted position with a contact for connecting the drawer to the connector, in accordance with various embodiments. In various embodiments, the fingerprint acquisition device with a sliding drawer 301 can implement a contact 401 configured to electronically connect the fingerprint module 302 with the connector 305 when the drawer is in an extracted position. The contact 401 can be mechanically connected to the chassis 303. For example, the contact can be on a platform 403, such as a PCB board, with traces 402 electronically connecting the contact 401 to the connector 305. The platform 403 can be mechanically connected to the chassis 303. A corresponding contact 404 can be located on the drawer 301, which contact can be electronically connected to the fingerprint module 302. The contacts 404, 401 can be configured such that the contact 404 on the drawer connects with the contact 401 on the chassis when the drawer is in the extracted position, resulting in the fingerprint module 302 being electronically connected to the connector 305 so that fingerprint data from a user's input into the fingerprint module 302 can be communicated to the user device through the connector 305.

FIG. 4B illustrates an example of a fingerprint acquisition device in a retracted position with a contact for connecting the drawer to the connector, in accordance with various embodiments. In an embodiment, the contacts 404, 401 can be configured such that the contact 404 on the drawer slides away and becomes disconnected from the contact 401 on the chassis when the drawer is moved into the retracted position, resulting in the fingerprint module 302 being electronically disconnected from the connector 305.

Figure 5A:
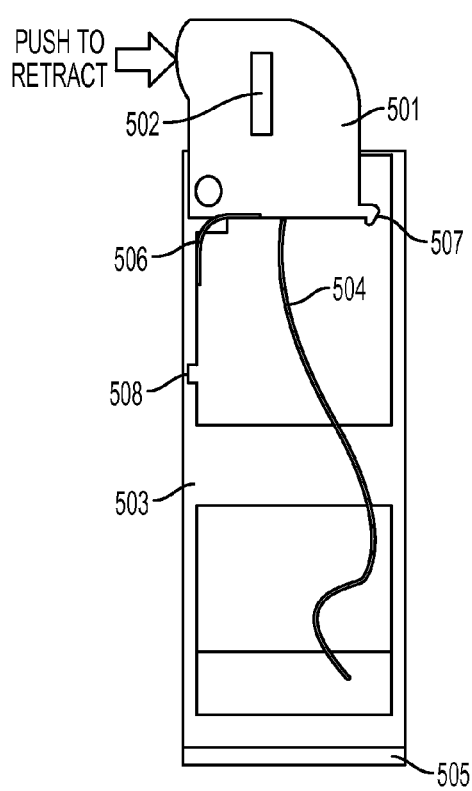
FIG. 5A illustrates a top view of an example of the fingerprint acquisition device with a rotating drawer in the extracted position, in accordance with various embodiments.

FIG. 5A illustrates a top view of an example of the fingerprint acquisition device with a rotating drawer in the extracted position, in accordance with various embodiments. A drawer 501 containing a fingerprint module 502 can rotate on a pivot within a chassis 503. The chassis can be located substantially within an expansion card slot of user device, such that when the drawer is in the extracted position, as illustrated, the drawer 501 extends outside of the user device and allows a user access to the fingerprint module 502. The user can input a reading of his or her fingerprint into the fingerprint module 502 for recognition by the system, such as by swiping his or her finger on the fingerprint module 502. The fingerprint module 502 can be connected by a wire 504, such as a USB wire, to an express card connector 505, which connector 505 can be configured to interface with the user device. A spring 506 can apply force on the drawer 501 to keep the drawer in the extracted position. A user can push on the drawer 501, as illustrated, to compress the spring 506 and rotate the drawer 501 into the chassis 503. A latch 507 can be located on the drawer 501 and a corresponding catch 508 can be located on the chassis 503. The latch 507 and catch 508 can be configured so that the latch 507 becomes locked into the catch 508 when the latch 507 is pushed into the catch 508. Hence, when the drawer reaches a retracted position, the latch 507 can lock into the catch 508, thereby locking the drawer in a retracted position.

Figure 5B:
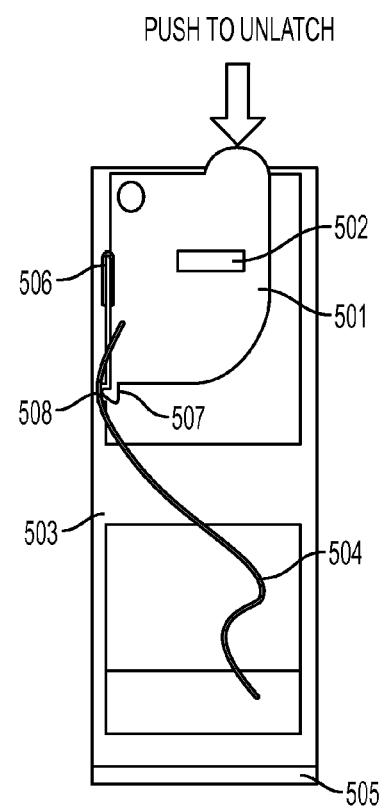
FIG. 5B illustrates a top view of an example of the fingerprint acquisition device with a rotating drawer in the retracted position, in accordance with various embodiments.

FIG. 5B illustrates a top view of an example of the fingerprint acquisition device with a rotating drawer in the retracted position, in accordance with various embodiments. As illustrated in the example, the spring 506 can be in a compressed state applying force on the drawer 501 pushing the drawer 501 out while the latch 507 can be locked into the catch 508, preventing the drawer 501 from sliding out of the chassis 503. The latch 507 and the catch 508 can be configured such that when the latch 507 is pushed into the catch 508, the latch 507 becomes unlocked from the catch 508. Hence, by pushing on the drawer 501, as illustrated, the latch 507 can become unlatched from the catch 508 and the drawer 501 can rotate out of the chassis 503 under the force of the spring 506, revealing the fingerprint module 502 to the user.

Figure 6A:
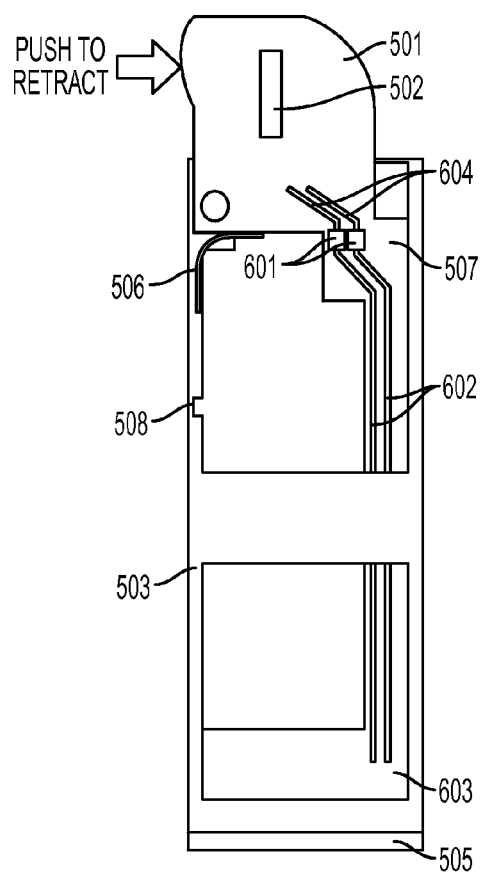
FIG. 6A illustrates an example of a fingerprint acquisition device in an extracted position with a contact for connecting the drawer to the connector, in accordance with various embodiments.

FIG. 6A illustrates an example of a fingerprint acquisition device in an extracted position with a contact for connecting the drawer to the connector, in accordance with various embodiments. In various embodiments, the fingerprint acquisition device with a rotating drawer 501 can implement a contact 601 configured to electronically connect the fingerprint module 502 with the connector 505 when the drawer is in an extracted position. A contact 601 can be mechanically connected to the chassis 503. For example, the contact can be on a platform 603, such as a PCB board, with traces 602 electronically connecting the contact 601 to the connector 505. The platform 603 can be mechanically connected to the chassis 503. A corresponding contact 604 can be located on the drawer 501, which contact can be electronically connected to the fingerprint module 502. The contacts 604, 601 can be configured such that the contact 604 on the drawer connects with the contact 601 on the chassis when the drawer is in the extracted position, resulting in the fingerprint module 502 being electronically connected to the connector 505 so that fingerprint data from a user's input into the fingerprint module 502 can be communicated to the user device through the connector 505.

Figure 6B:
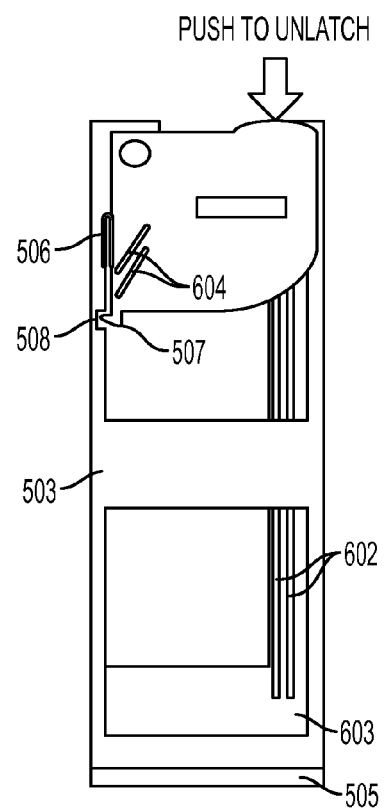
FIG. 6B illustrates an example of a fingerprint acquisition device in a retracted position with a contact for connecting the drawer to the connector, in accordance with various embodiments.

FIG. 6B illustrates an example of a fingerprint acquisition device in a retracted position with a contact for connecting the drawer to the connector, in accordance with various embodiments. In an embodiment, the contacts 604, 601 can be configured such that the contact 604 on the drawer slides away and becomes disconnected from the contact 601 on the chassis when the drawer is moved into the retracted position, resulting in the fingerprint module 502 being electronically disconnected from the connector 505.

In various embodiments, the apparatus and/or the connector to the expansion card interface can conform to the standards for PCMCIA expansion cards. For example, the apparatus and/or the connector can be configured to conform to the physical and/or size standards for PCMCIA expansion cards.

Figure 7:
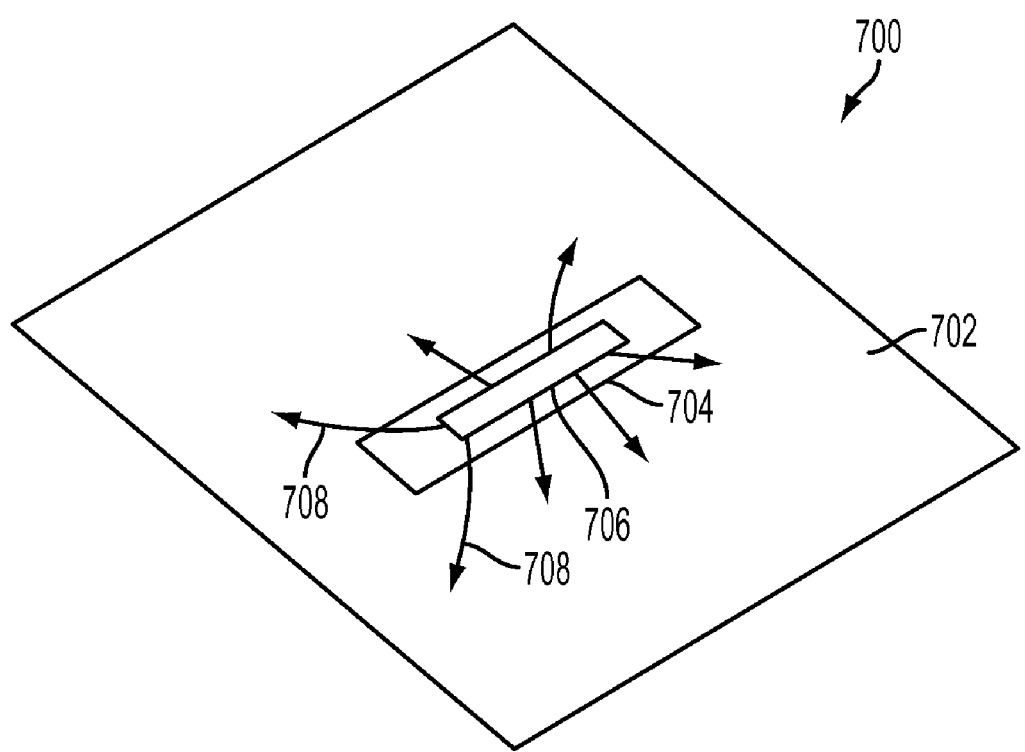
FIG. 7 illustrates an example of a fingerprint sensor that can be included in the fingerprint module of various embodiments.

The fingerprint module in the apparatus can comprise any of a variety of devices capable of reading a human fingerprint. FIG. 7 illustrates an example of a fingerprint sensor that can be included in the fingerprint module of various embodiments. FIG. 7 depicts an embodiment of an illuminated fingerprint sensor 700, which includes a substrate 702, an opening 704 in the substrate, an image sensor 706, and a light source (not shown in FIG. 7) that causes light 708 to be emitted in an area proximate image sensor 706. Substrate 702 may be a printed circuit board, a cover, a housing, or other object to which the fingerprint sensor is coupled. Opening 704 exposes image sensor 706, thereby allowing a user to access the image sensor. Opening 704 also permits light 708 to be emitted near image sensor 706 to communicate information regarding the state of the fingerprint sensor.

Image sensor 706 receives drive signals from a drive signal generator (not shown), senses fingerprint characteristics as a finger is "swiped" across the image sensor, and delivers sensed fingerprint data to an image sensing module (not shown). In the embodiment of FIG. 7, image sensor 706 is a "swipe" fingerprint sensor. In other embodiments, image sensor 706 is a "static" fingerprint sensor (also referred to as a "placement" fingerprint sensor).

As discussed below, particular embodiments of illuminated fingerprint sensor 700 utilize one or more light sources. The light source used to illuminate the fingerprint sensor may be a light emitting diode (LED) or any other type of light source capable of illuminating the fingerprint sensor as described herein.

FIG. 8A depicts an example assembly of an illuminated fingerprint sensor 800. Fingerprint sensor 800 includes a sensor portion 806 and an illumination portion 808. Sensor portion 806 is comprised of a substantially flexible substrate 804 with an image sensing module 802 attached thereto. Flexible substrate 804 has a raised (arched) portion at one end that includes an image sensor to sense fingerprint characteristics. In a particular embodiment, flexible substrate 804 is formed using Kapton® polyimide film (available from DuPont). In the embodiment of FIG. 8A, flexible substrate 804 is transparent or semi-transparent such that light is at least partially transmitted through flexible substrate 804.

Illumination portion 808 of illuminated fingerprint sensor 800 includes a rigid substrate 810, a raised portion 812, and a light source 814 that emits light 816 in multiple directions. Rigid substrate 810 can be formed from a variety of compounds, such as fiberglass filled epoxy. Raised portion 812 substantially corresponds in shape and size to the raised portion of sensor portion 806.

FIG. 8B depicts illuminated fingerprint sensor 800 after sensor portion 806 has been mated to illumination portion 808. In this configuration, light source 814 emits light 816 that is fully or partially transmitted through flexible substrate 804 such that the light is visible to a user of illuminated fingerprint sensor 800. Sensor portion 806 may be bonded to illumination portion 808 or otherwise configured such that the sensor portion and the illumination portion remain mated to one another. In particular embodiments, sensor portion 806 is bonded to illumination portion 808 using adhesive bonding, such as double-sided adhesive tape or a bonding glue.

Other embodiments mate sensor portion 806 to illumination portion 808 without bonding the two portions using adhesives or glue. For example, sensor portion 806 can be mated to illumination portion 808 using a mechanical structure, such as a thin wire clip or other mechanism. In another implementation, a portion of the device housing in which illuminated fingerprint sensor 800 is mounted acts to maintain the mated position of sensor portion 806 and illumination portion 808. Alternatively, sensor portion 806 can be configured to wrap around at least part of illumination portion 808 to mate the two portions to one another.

FIG. 8C depicts illuminated fingerprint sensor 800 mounted in a housing 822 or other mounting mechanism. In an embodiment, the housing 822 can be mounted in a slidable or rotatable drawer of the fingerprint acquisition device. In an embodiment, the drawer can include the housing 822. Housing 822 includes an opening defined by edges 824 and 826. The assembly shown in FIG. 8B is positioned within housing 822 such that the raised portion of substrate 810 (and the raised portion of flexible substrate 804) aligns with the opening in housing 822. This arrangement allows a user's finger to be swiped across the raised portion of flexible substrate 804, thereby allowing the user's fingerprint characteristics to be sensed by the image sensor. Additionally, this arrangement within housing 822 allows light 816 emitted from light source 814 to travel through the opening in housing 822. Thus, the light emitted from light source 814 is visible to a user of the device in which the illuminated fingerprint sensor 800 is mounted.

While certain exemplary embodiments have been described and shown in the accompanying drawings, it is to be understood that such embodiments are merely illustrative of and not restrictive on the broad invention as defined in the appended Claims and other Claims that may be later presented, and that this invention is not limited to the specific constructions and arrangements shown and described, since various other modifications may occur to those ordinarily skilled in the art. Hence, alternative arrangements of drawers, springs, latches, fingerprint sensors, and other components can occur without departing from the spirit and scope of the invention. Similarly, components not explicitly mentioned in this specification can be included in various embodiments of this invention without departing from the spirit and scope of the invention. Also, functions and logic described as being performed in certain components in various embodiments of this invention can, as would be apparent to one skilled in the art, be readily performed in whole or in part in different components or in different configurations of components not explicitly mentioned in this specification, without departing from the spirit and scope of the invention. Accordingly, the specification and drawings are to be regarded in an illustrative rather than a restrictive sense.

While certain exemplary embodiments have been described and shown in the accompanying drawings, it is to be understood that such embodiments are merely illustrative of and not restrictive on the broad invention, and that this invention is not limited to the specific constructions and arrangements shown and described, since various other modifications may occur to those ordinarily skilled in the art. Accordingly, the specification and drawings are to be regarded in an illustrative rather than a restrictive sense.

Reference in the specification to "an embodiment," "one embodiment," "some embodiments," "various embodiments" or "other embodiments" means that a particular feature, structure, or characteristic described in connection with the embodiments is included in at least some embodiments, but not necessarily all embodiments. References to "an embodiment," "one embodiment," or "some embodiments" are not necessarily all referring to the same embodiments. If the specification states a component, feature, structure, or characteristic "may," "can," "might," or "could" be included, that particular component, feature, structure, or characteristic is not required to be included. If the specification or Claims refer to "a" or "an" element, that does not mean there is only one of the element. If the specification or Claims refer to an "additional" element, that does not preclude there being more than one of the additional element.

The invention claimed is:

1. An apparatus comprising:
   a housing configured to be secured in a user device;
   a drawer configured to slide in and out of the housing;
   a fingerprint acquisition device attached to the drawer;
   a latch located on the drawer and a catch located on the housing configured to:
      lock the latch into the catch when the drawer is pushed in so as to push the latch into the catch; and
      when the latch is locked into the catch, unlock the latch from the catch when pressure is applied to push the drawer in so as to push the latch into the catch.

2. The apparatus of claim 1, further comprising:
   a connector configured to interface with a portable computer;
   a wire configured to electronically connect the fingerprint acquisition device with the connector.

3. The apparatus of claim 2, wherein the apparatus and connector conform to the physical standards for PCMCIA expansion cards.

4. The apparatus of claim 2, wherein the apparatus and connector conform to the size standards for PCMCIA expansion cards.

5. An apparatus comprising:
   a housing configured to be secured in a user device;
   a drawer configured to swing on a pivot in and out of the housing;
   a fingerprint acquisition device attached to the drawer;
   a latch located on the drawer and a catch located on the housing configured to:
   lock the latch into the catch when the drawer is pushed in so as to rotate the drawer on the pivot and push the latch into the catch; and when the latch is locked into the catch, unlock the latch from the catch when pressure is applied to push the drawer in so as to rotate the drawer on the pivot and push the latch into the catch.

6. The apparatus of claim 5, further comprising:
   a connector configured to interface with a portable computer;
   a contact configured to electronically connect the fingerprint acquisition device with the connector when the drawer is in an extracted position.

7. The apparatus of claim 6, wherein the apparatus and connector conform to the physical standards for PCMCIA expansion cards.

8. The apparatus of claim 6, wherein the apparatus and connector conform to the size standards for PCMCIA expansion cards.

* * * * *